(12) United States Patent
Okamoto et al.

(10) Patent No.: US 6,704,076 B2
(45) Date of Patent: Mar. 9, 2004

(54) METHOD FOR FABRICATING A LIQUID CRYSTAL DISPLAY DEVICE

(75) Inventors: Mamoru Okamoto, Tokyo (JP);
Michiaki Sakamoto, Tokyo (JP);
Hironori Kikkawa, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 0 days.

(21) Appl. No.: 10/173,518

(22) Filed: Jun. 17, 2002

(65) Prior Publication Data
US 2002/0191146 A1 Dec. 19, 2002

(30) Foreign Application Priority Data

Jun. 18, 2001 (JP) ........................ 2001-183569

(51) Int. Cl.[7] ..................... G02F 1/1335; G02B 5/20
(52) U.S. Cl. .................................. 349/106; 430/7
(58) Field of Search .................... 349/43, 106, 187; 430/7, 321

(56) References Cited

U.S. PATENT DOCUMENTS 5,689,318 A  * 11/1997  Matsuyama et al. ........ 349/106
6,570,639 B1 *  5/2003  Manabe et al. ............. 349/190

FOREIGN PATENT DOCUMENTS

JP          04-369605       12/1992
JP          2000-231123     8/2000

* cited by examiner

Primary Examiner—Toan Ton
Assistant Examiner—Tai Duong
(74) Attorney, Agent, or Firm—Hayes Soloway P.C.

(57) ABSTRACT

Color filters of R, G and B consisting of a negative resist film are simultaneously exposed by use of a photomask intercepting light for the regions connected to the transparent pixel electrodes after the source electrodes. Then, the color filters are simultaneously developed. Since the color filters consist of a negative resist film, the regions of the color filters corresponding to the light-intercepted regions, that is, the regions connected to the transparent pixel electrodes after the source electrodes are removed by the development, so that openings are formed.

13 Claims, 25 Drawing Sheets

METHOD FOR FABRICATING A LIQUID CRYSTAL DISPLAY DEVICE

BACKGROUND OF THE INVENTION

1. Technical Field of the Invention

The present invention relates to a method for fabricating a liquid crystal display device, and more particularly, to a method for fabricating a CF (color filter) on a TFT (thin-film transistor) liquid crystal display device in which switching elements and color filters of a plurality of colors are formed on the same transparent substrate.

2. Description of the Related Art

In some color twisted nematic (TN) liquid crystal display devices having TFTs, color filters are provided on a counter substrate opposed to the TFT substrate where TFTs are provided. In forming the counter substrate for such liquid crystal display devices, material films of color filters of three colors containing a thermosetting resin are printed onto the transparent substrate, thereafter, the material films are hardened by being heated, thereby forming the color filters. This fabricating method is described, for example, in Japanese Unexamined Patent Publication Hei-4-369605. Then, the TFT substrate and the counter substrate are bonded together to form a liquid crystal display panel.

FIG. 1 is a cross-sectional view showing the positional relationship between the TFT substrate and the counter substrate in a conventional liquid crystal display device. In the conventional liquid crystal display device, a liquid crystal layer 230 is provided between first and second transparent substrates 201 and 223. Hereinafter, the liquid crystal layer 230 side of the first and the second transparent substrates 201 and 223 will be referred to as the inner side, and the side opposite thereto, as the outer side.

On the inside surface of the first transparent substrate 201, gate electrodes 203 connected to scanning lines (not shown) are formed, and a gate insulating film 204 is formed so as to cover the gate electrodes 203. In the positions on the gate insulating film 204 corresponding to the gate electrodes 203, semiconductor layers 205 are formed, and drain electrodes 207 and source electrodes 208 are formed so as to sandwich the semiconductor layers 205. Further, a passivation film 209 is formed so as to cover them, and pixel electrodes 216 connected to the source electrodes 208 pixel by pixel through contact holes (not shown) formed in the passivation film 209 are formed on the passivation film 209. On the pixel electrodes 216, an alignment film 217 is formed.

On the inside surface of the second transparent substrate 223, a black matrix 212, color filters 210 of each color, a transparent common electrode 221 and an alignment film 222 are provided in succession.

In a case where the conventional liquid crystal display device in which such color filters are provided on the counter substrate is fabricated, when the TFT substrate and the counter substrate are bonded together, a position shift sometimes occurs between the region on the TFT substrate that is partitioned by the scanning lines and the data lines and in which the pixel electrodes 216 are provided, and the region on the counter substrate that is partitioned by the black matrix and in which the color filters are provided. When such a position shift occurs, colors come out in positions where no color is expected to come out in design, so that desired color development is not obtained. For this reason, it is necessary to provide between pixels a margin for compensating for the position shift, that is, a black matrix larger than the theoretical value, so that it is difficult to obtain pixels of a sufficient area. Consequently, sufficient luminance cannot be obtained. This defect becomes more conspicuous as the pitch between pixels decreases with improvement in resolution.

Therefore, recently, a liquid crystal display device in which color filters are provided on the TFT substrate has been developed, and this substrate is called a CF on a TFT substrate (Japanese Unexamined Patent Publication 2000-231123).

A method for fabricating a conventional CF on a TFT substrate will be described. FIG. 2 through FIG. 11 are cross-sectional views showing the method for fabricating the conventional CF on a TFT substrate in order in which the fabricating steps are performed.

In the method for fabricating the conventional CF on a TFT substrate, first, scanning lines 102 and gate electrodes (not shown) are selectively formed on a transparent substrate 101, and as shown in FIG. 2, a gate insulating film 104 is formed on the entire surface. Then, semiconductor layers (not shown), data lines 106, drain electrodes (not shown) and source electrodes 108 are formed on the gate insulating film 104, and further, a passivation film 109 is formed on the entire surface. By this step, a TFT is formed in each pixel. Further, a red negative photosensitive resin film 110R$a$ is formed on the passivation film 109 by spin coating. The viscosity of the photosensitive resin film 110R$a$ is approximately 10 (mPa.S).

Then, as shown in FIG. 3, the photosensitive resin film 110R$a$ is exposed by use of a photomask 111R intercepting light for the regions other than the pixels for red and the regions of the pixels for red where contact holes for connecting the transparent pixel electrodes and the source electrodes 108 are to be formed.

Then, the photosensitive resin film 110R$a$ is developed. Since the photosensitive resin film 110R$a$ is negative, the regions of the photosensitive resin film 110R$a$ corresponding to the light-intercepted regions, that is, the regions other than the pixels for red and the regions having the pixels for red where the contact holes for connecting the transparent pixel electrodes and the source electrodes 108 are to be formed are removed by the development as shown in FIG. 4, so that color filters 110R are formed.

Then, as shown in FIG. 5, a green negative photosensitive region film 110G$a$ is formed on the entire surface by spin coating. The viscosity of the photosensitive resin film 110G$a$ is also approximately 10 (mPa.s).

Then, as shown in FIG. 6, the photosensitive resin film 110G$a$ is exposed by use of a photomask 111G intercepting light for the regions other than the pixels for green and the regions of the pixels for green where contact holes for connecting the transparent pixel electrodes and the source electrodes 108 are to be formed.

Then, as shown in FIG. 7, the photosensitive resin film 110G$a$ is developed. Since the photosensitive resin film 110G$a$ is negative, the regions of the photosensitive resin film 110G$a$ corresponding to the light-intercepted regions are removed by the development, so that color filters 110G are formed.

Then, as shown in FIG. 8, a blue negative photosensitive region film 110B$a$ is formed on the entire surface by spin coating. The viscosity of the photosensitive resin film 110B$a$ is also approximately 10 (mPa.s).

Then, as shown in FIG. 9, the photosensitive resin film 110B$a$ is exposed by use of a photomask 111B intercepting light for the regions other than the pixels for blue and the regions of the pixels for blue where contact holes for connecting the transparent pixel electrodes and the source electrodes 108 are to be formed.

Then, the photosensitive resin film 110Ba is developed. Since the photosensitive resin film 110Ba is negative, the regions of the photosensitive resin film 110Ba corresponding to the light-intercepted regions are removed by the development as shown in FIG. 10, so that color filters 110B are formed.

Then, as shown in FIG. 11, a black matrix 112 is formed in the regions corresponding to the TFTs, and the scanning lines and the data lines 106 on the color filters. Further, an overcoat layer 113 is formed on the black matrix 112, and an overcoat layer 114 having openings 114a in the openings of the color filters 10R, 110G and 10B is formed. Then, openings 109a are formed in the regions of the passivation film 109 exposed in the openings 114a. Contact holes 115 reaching the source electrodes 108 from the openings 109a and 114a are structured. Then, transparent pixel electrodes 116 connected to the source electrodes 108 through the contact holes 115 pixel by pixel are formed on the overcoat layer 114. Then, an alignment film (not shown) is formed on the transparent pixel electrodes 116. In this manner, the CF on a TFT substrate is fabricated.

However, when the CF on a TFT substrate is fabricated by this method, the necessity for application of the photosensitive resist film and the exposure and development color by color increases the number of fabricating steps. In addition, since the photosensitive resist film is applied to the entire surface of the transparent substrate, that is, since the photosensitive resist film is applied also to pixels not requiring the application of the photosensitive resist film, the amount of photosensitive resist film removed by the succeeding exposure and development is extremely large, which increases the manufacturing cost more than necessary.

Therefore, it is considered to apply printing as described above using a thermosetting resin, to form color filters on the CP on a TFT substrate. However, when printing is used, since the current printing machines are not high in precision, alignment precision as high as that of photolithography cannot be obtained. In the conventional liquid crystal display devices in which the color filters are provided on the counter substrate, since it is necessary only that the color filters can be formed in the region partitioned by the black matrix, particularly high alignment precision is not required. However, in the case of the CF on a TFT substrate, since the color filters are present between the source electrodes and the pixel electrodes, openings are required for color filters, so that extremely high alignment precision is required. That is, when the alignment precision on the CF on a TFT substrate is low, a position shift of the openings occurs, so that excellent images cannot be obtained due to variations in resistance. Therefore, it is impossible to simply divert the conventional printing to the fabrication of the CF on a TFT substrate.

SUMMARY OF THE INVENTION

An object of the present invention is to provide a method for fabricating a liquid crystal display device capable of reducing the number of fabricating steps while ensuring high alignment precision, preferably, capable of reducing the consumption amount of the material.

A method for fabricating a liquid crystal display device according to the present invention comprises the steps of: forming a switching element for each pixel on a transparent substrate; forming color filters of a plurality of colors on the transparent substrate so that the color filters cover the switching elements; simultaneously forming an opening reaching a predetermined electrode of each of the switching elements, in each of the color filters for all colors; and forming, on each of the color filters, a pixel electrode connected to the predetermined electrode through the opening.

According to the present invention, since after the color filters are formed, the formation of the openings in the color filters is simultaneously performed on the color filters for all colors, a reduction in alignment precision occurring when printing is adopted can be avoided. In addition, since it is unnecessary to perform the formation of the openings color by color, the number of fabricating steps can be reduced to improve productivity.

In forming of the color filters of the plurality of colors, by printing materials of the color filters each colored in a predetermined color onto the transparent substrate, the color filters of the plurality of colors can be easily formed.

In the forming of the color filters of the plurality of colors, the color filters for all colors are preferable to be simultaneously formed. Thereby, it is unnecessary to apply the color filters color by color, so that the number of fabricating steps can be further reduced.

By using a photosensitive resist film as the materials of the color filters, photolithography can be adopted for the formation of the openings, so that the openings can be formed with high precision. Consequently, the forming of the openings can have the steps of: exposing the color filters of the plurality of colors by use of a photomask intercepting light for positions corresponding to the predetermined electrodes; and developing the color filters of the plurality of colors.

Another method according to the present invention is a method for fabricating a liquid crystal display device in which switching elements and color filters of a plurality of colors are formed on the same transparent substrate. The method comprises the steps of simultaneously printing, onto the transparent substrate, the color filters for all colors consisting of a photosensitive resist film; exposing the color filters of the plurality of colors by use of a photomask intercepting light for positions corresponding to predetermined electrodes of the switching elements; and developing the color filters of the plurality of colors.

According to the present invention, improvement in productivity because of a reduction in the number of fabricating steps, and a reduction in the consumption amount of the material are achieved, and high alignment precision is ensured in the formation of the openings.

DETAILED DESCRIPTION OF THE PREFERRED EMBODIMENTS

Figure 20:
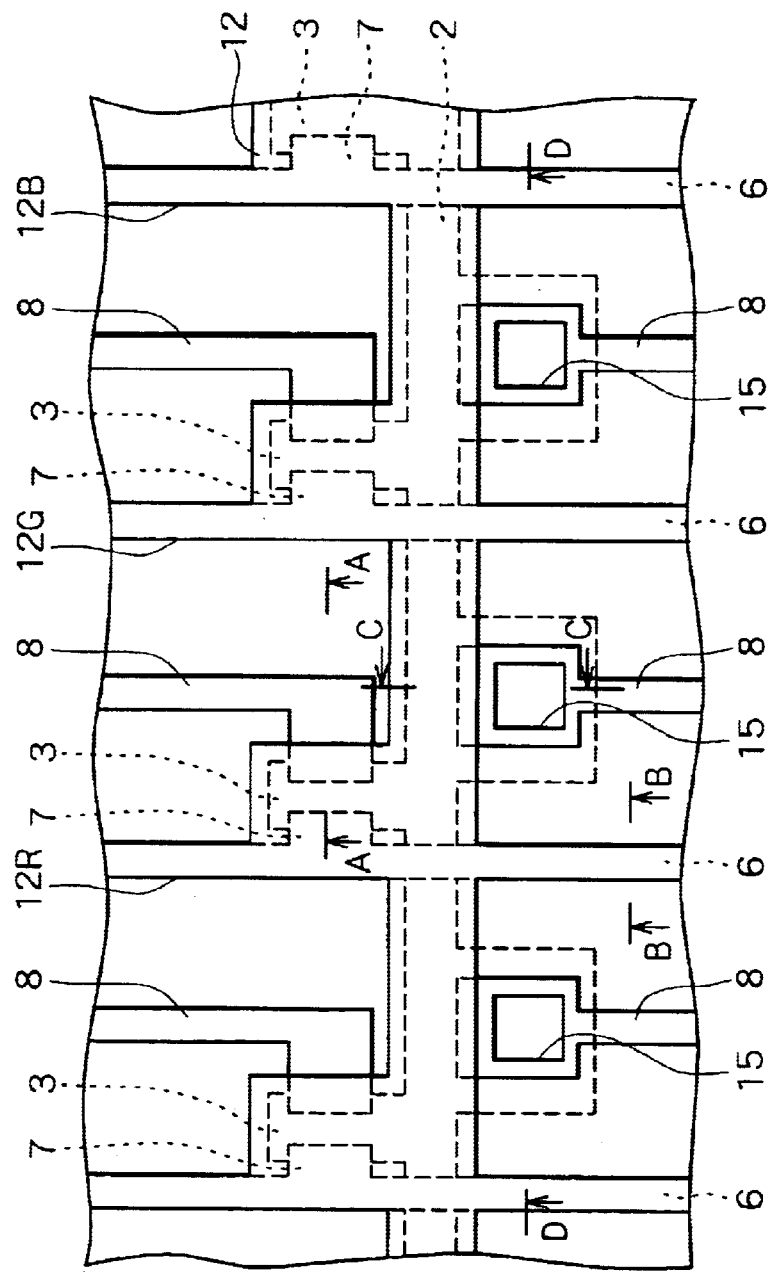
FIG. 20 is a layout view showing the arrangement of the electrodes and the black matrix in the liquid crystal display device fabricated by the embodiment of the present invention.
Figure 21:
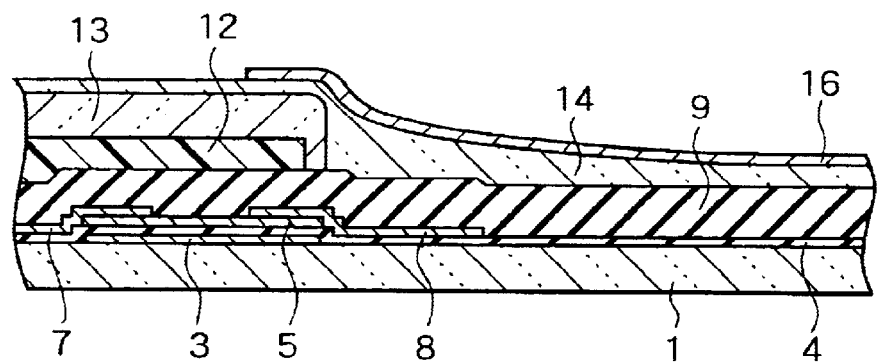
FIG. 21 is a cross-sectional view taken along the line A—A of FIG. 20.
Figure 22:
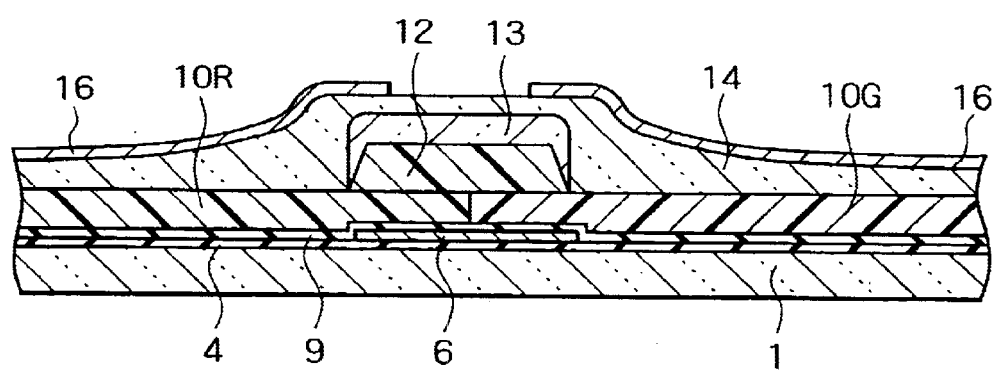
FIG. 22 is a cross-sectional view taken along the line B—B of FIG. 20.
Figure 23:
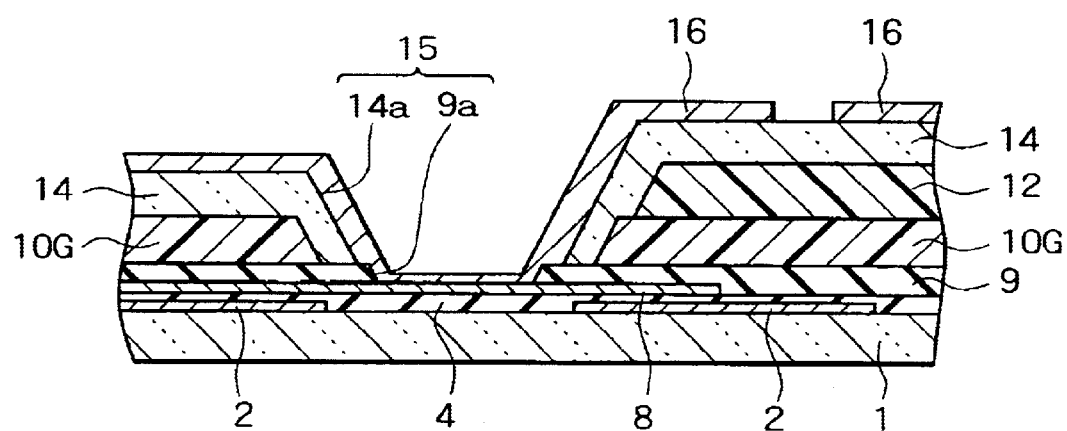
FIG. 23 is a cross-sectional view taken along the line C—C of FIG. 20.

Hereinafter, a method for fabricating a liquid crystal display device according to an embodiment of the present invention will be concretely described with reference to the attached drawings. FIG. 12 through FIG. 19 are cross-sectional views showing the method for fabricating the liquid crystal display device according to the embodiment of the present invention in order in which the fabricating steps are performed. FIG. 20 is a layout view showing the arrangement of the electrodes and the black matrix in the liquid crystal display device fabricated according to the embodiment of the present invention. FIG. 21 through FIG. 23 are cross-sectional views taken along the lines A—A, B—B and C—C of FIG. 20, respectively. FIG. 12 through FIG. 19 correspond to cross-sectional views taken along the line D—D of FIG. 20. In FIG. 20, the transparent pixel electrodes are not shown.

Figure 1:
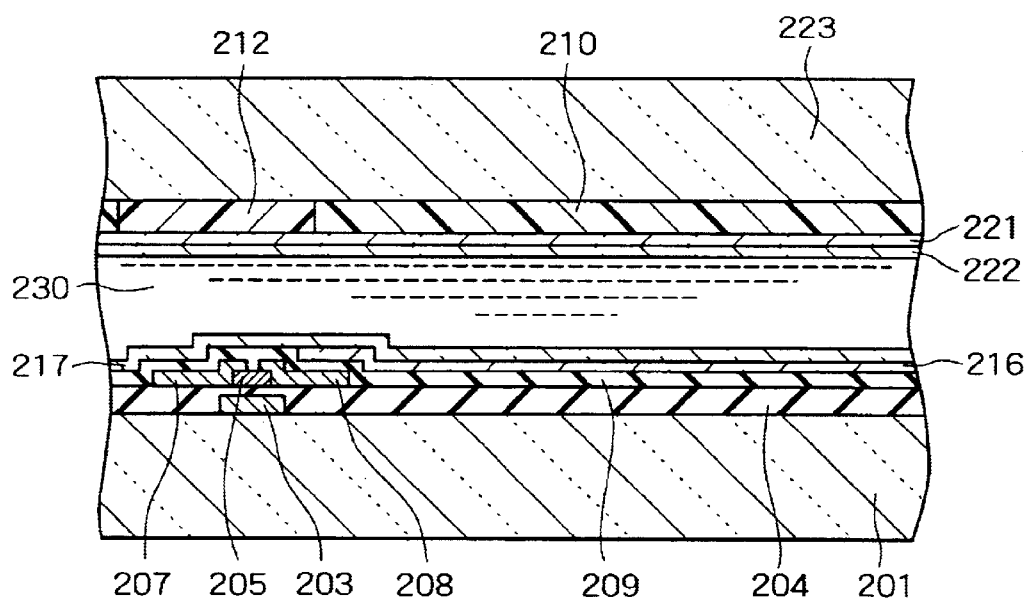
FIG. 1 is a cross-sectional view showing the positional relationship between the TFT substrate and the counter substrate in the conventional liquid crystal display device.
Figure 2:
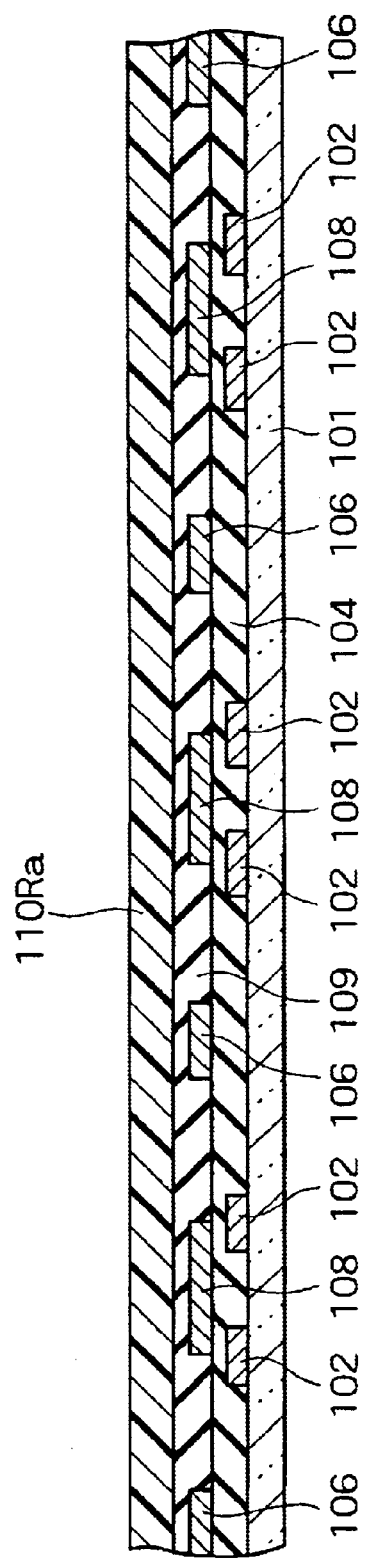
FIG. 2 is a cross-sectional view showing the method for fabricating the conventional CF on a TFT substrate.
Figure 3:
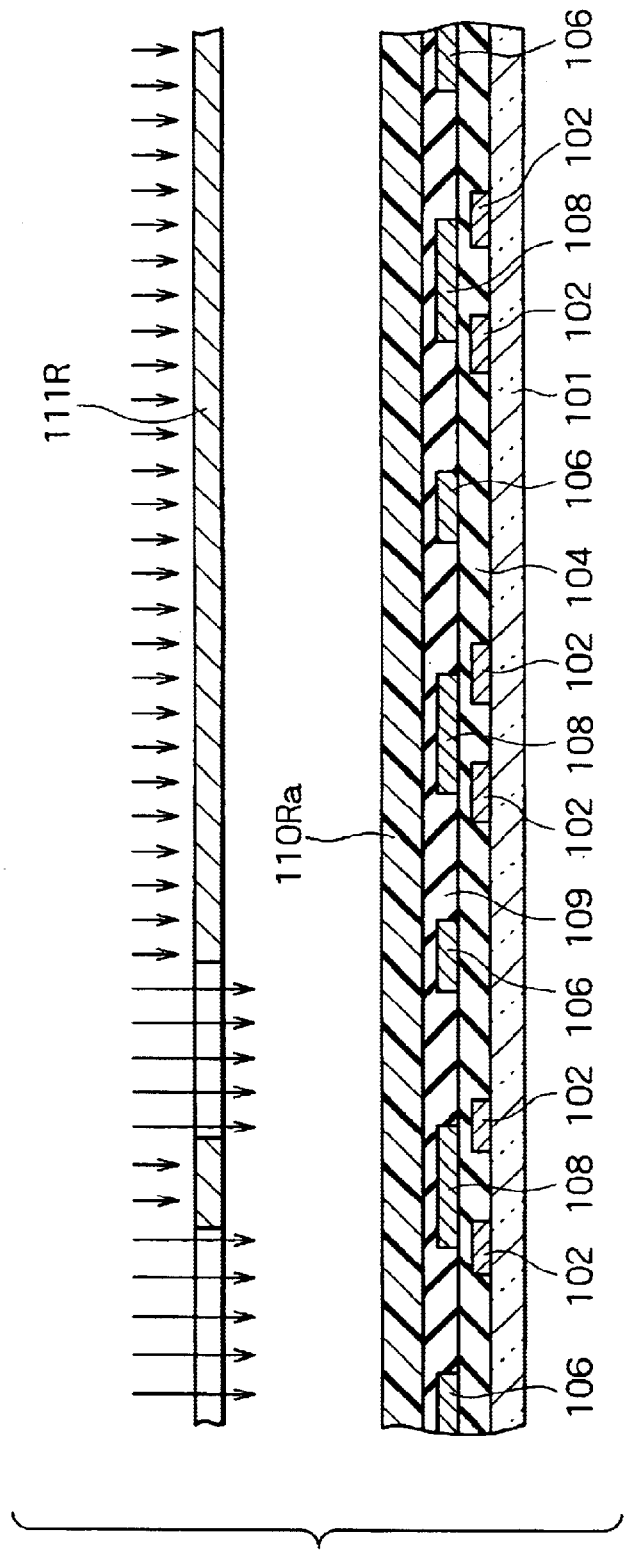
FIG. 3 is a cross-sectional view showing the fabricating step subsequent to the one shown in FIG. 2.
Figure 4:
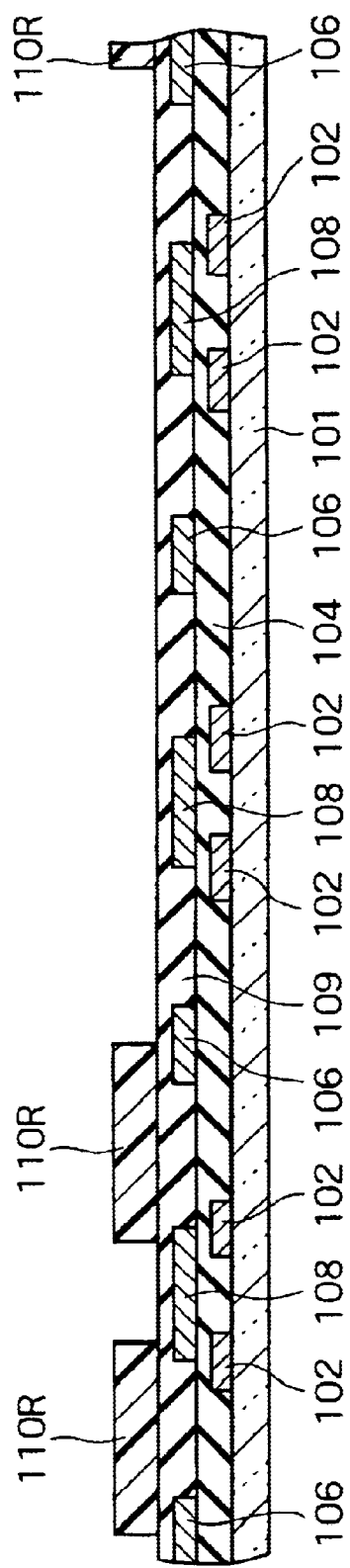
FIG. 4 is a cross-sectional view showing the fabricating step subsequent to the one shown in FIG. 3.
Figure 5:
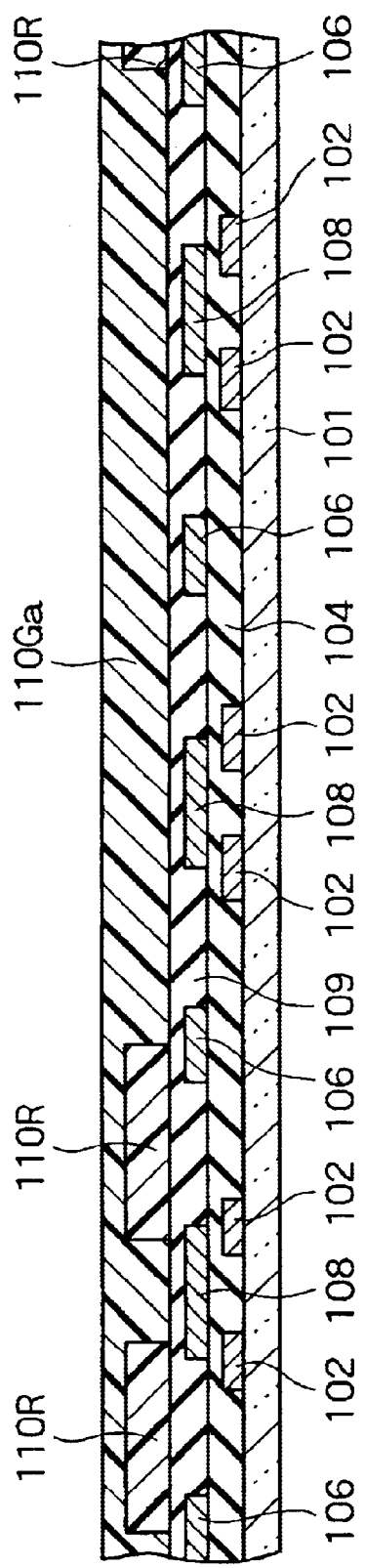
FIG. 5 is a cross-sectional view showing the fabricating step subsequent to the one shown in FIG. 4.
Figure 6:
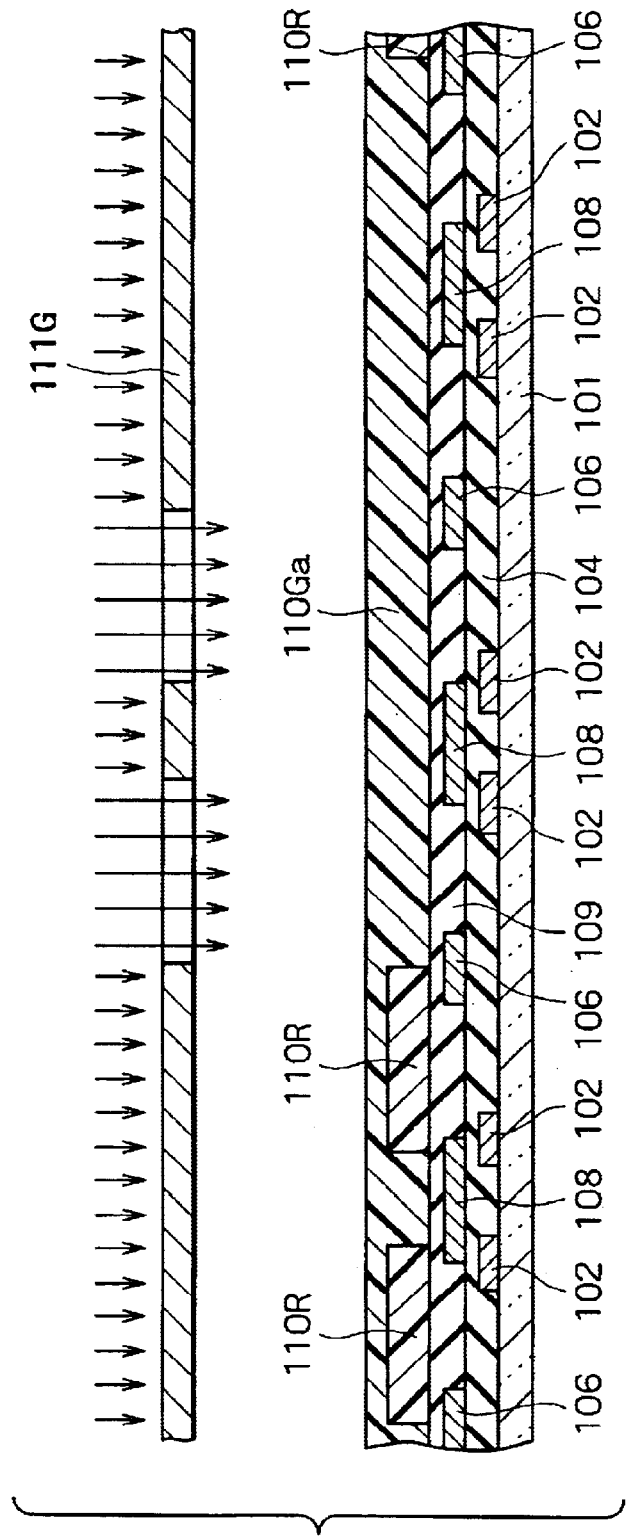
FIG. 6 is a cross-sectional view showing the fabricating step subsequent to the one shown in FIG. 5.
Figure 7:
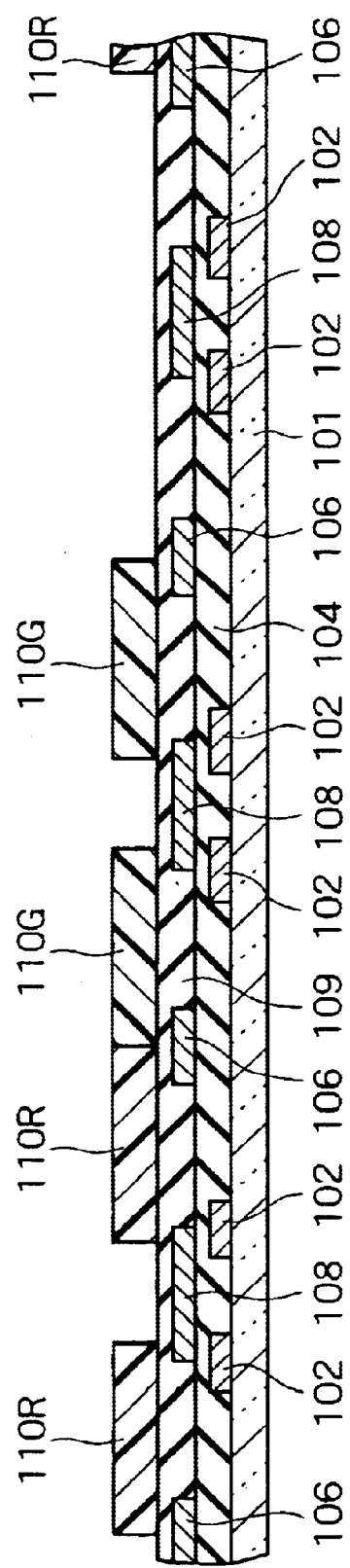
FIG. 7 is a cross-sectional view showing the fabricating step subsequent to the one shown in FIG. 6.
Figure 8:
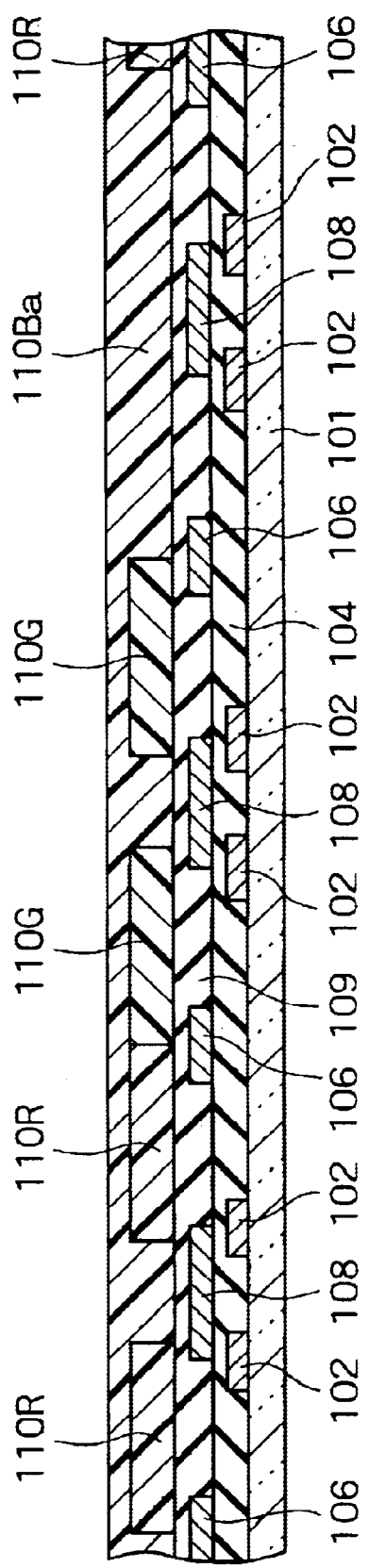
FIG. 8 is a cross-sectional view showing the fabricating step subsequent to the one shown in FIG. 7.
Figure 9:
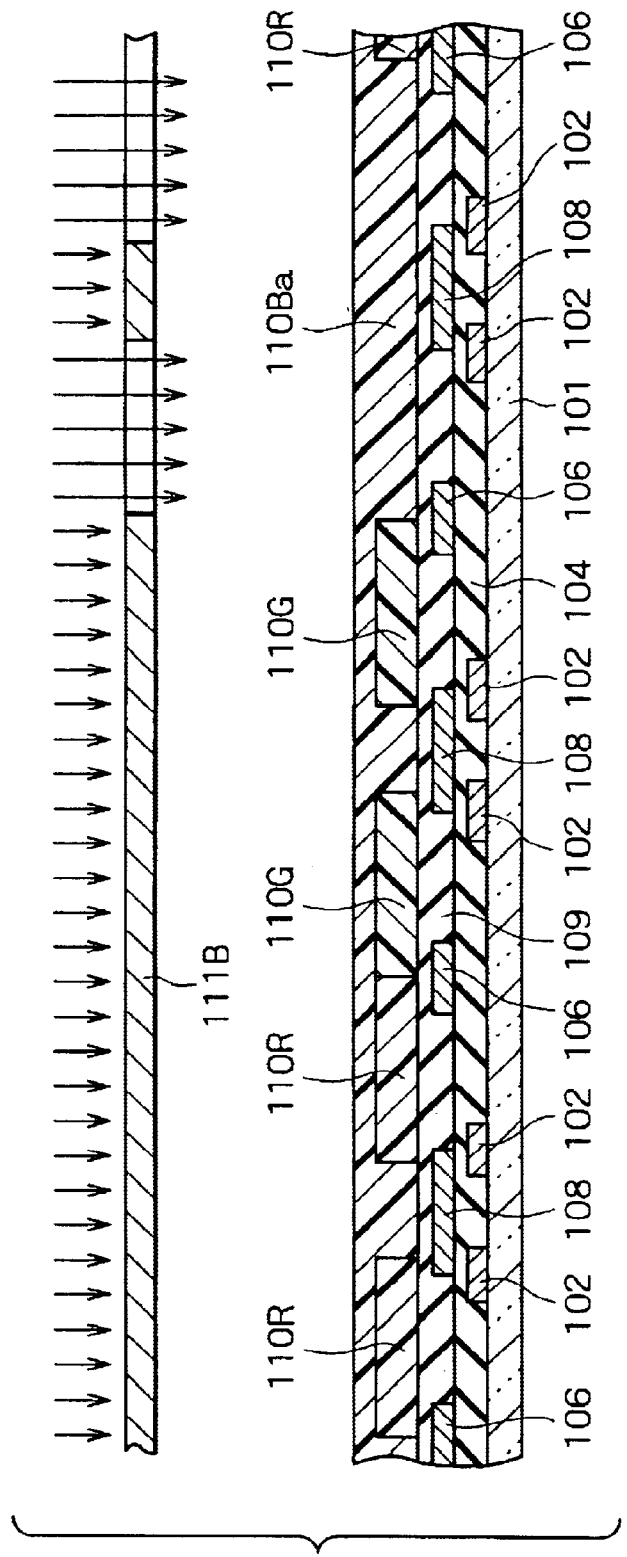
FIG. 9 is a cross-sectional view showing the fabricating step subsequent to the one shown in FIG. 8.
Figure 10:
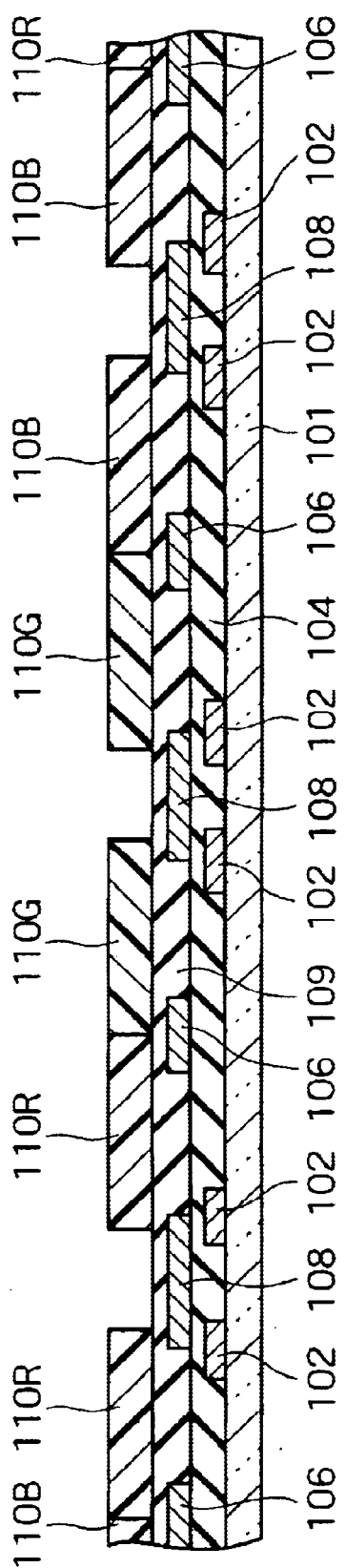
FIG. 10 is a cross-sectional view showing the fabricating step subsequent to the one shown in FIG. 9.
Figure 11:
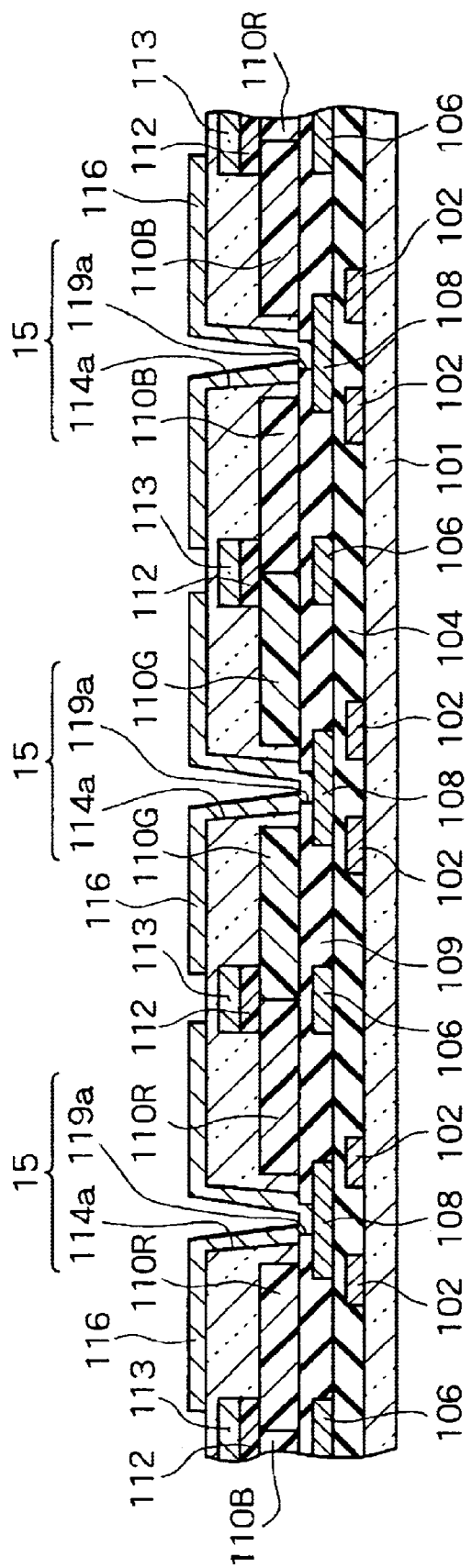
FIG. 11 is a cross-sectional view showing the fabricating step subsequent to the one shown in FIG. 10.
Figure 12:
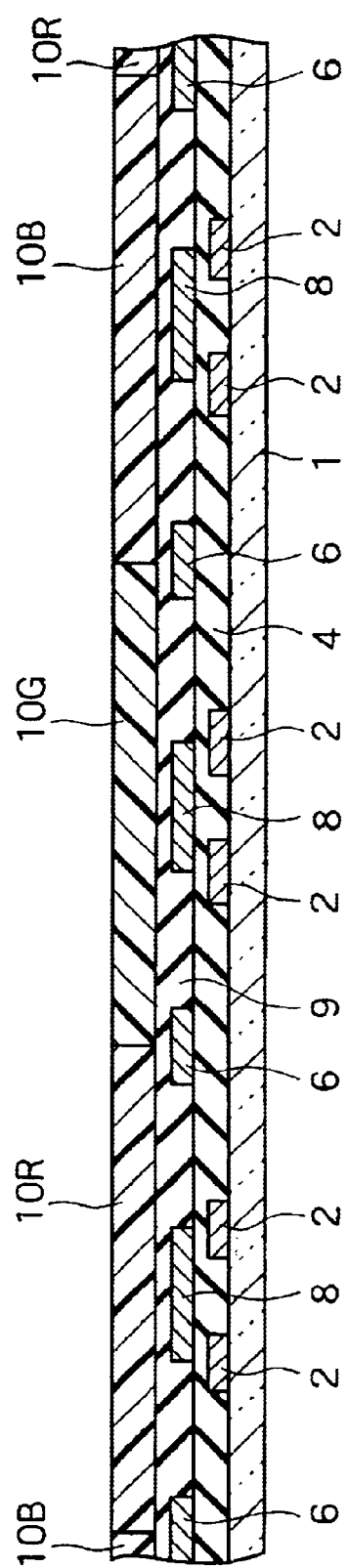
FIG. 12 is a cross-sectional view showing the method for fabricating a liquid crystal display device according to an embodiment of the present invention.

In the present embodiment, first, scanning lines 2 and gate electrodes 3 (see FIG. 20 and FIG. 21) are selectively formed on a transparent substrate 1, and as shown in FIG. 12, a gate insulating film 4 is further formed on the entire surface. Then, semiconductor layers 5 made of, for example, amorphous silicon or polysilicon (see FIG. 21), data lines 6, drain electrodes 7 and source electrodes 8 are formed on the gate insulating film 4, and a passivation film 9 is further formed on the entire surface. By this step, a TFT is formed in each pixel. The scanning lines 2 have a linear region extending in one direction and a region protruding from the linear region to the side opposite to the gate electrode 3 and overlapping the source electrode 8 with the gate insulating film 4 therebetween. As the transparent substrate 1, for example, a glass substrate or a transparent resin substrate is used. The gate insulating film 4 comprises, for example, a lamination of an SiOx film and an SiNx film, and the total thickness thereof is, for example, 1000 to 2000 Å. The scanning lines 2, the gate electrodes 3, the data lines 6, the drain electrodes 7 and the source electrodes 8 comprise, for example, an Al film, an Mo film or a Cr film having a thickness of 1000 to 4000 Å. The semiconductor layers 5 comprise, for example, an amorphous silicon layer having a thickness of approximately 4000 Å, and function as the channels of the TFTs. The passivation film 9 comprises, for example, an SiNx film having a thickness of 1000 to 2000 Å.

Further, as shown in FIG. 12, red color filters 10R, green color filters 10G and blue color filters 10B are simultaneously formed on the passivation film 9 by printing so as to correspond to the pixels of each color. For the color filters 10R, the color filters 10G and the color filters 10B, for example, negative photosensitive acrylic. resist films with a thickness of 1.0 to 2.0 µm in which desired pigments are dispersed are used, and the viscosity thereof is, for example, approximately 10 to 20 (mPa.s). When the color filters 10R, 10G and 10B are formed, the thicknesses of the color filters may be made uniform by printing a film of 5 to 10 µm in the center of each pixel by a printing machine and then, flattening it by pressurizing it by use of a surface plate or the like, or flat films having a uniform thickness may be printed as color filters by a printing machine.

Figure 13:
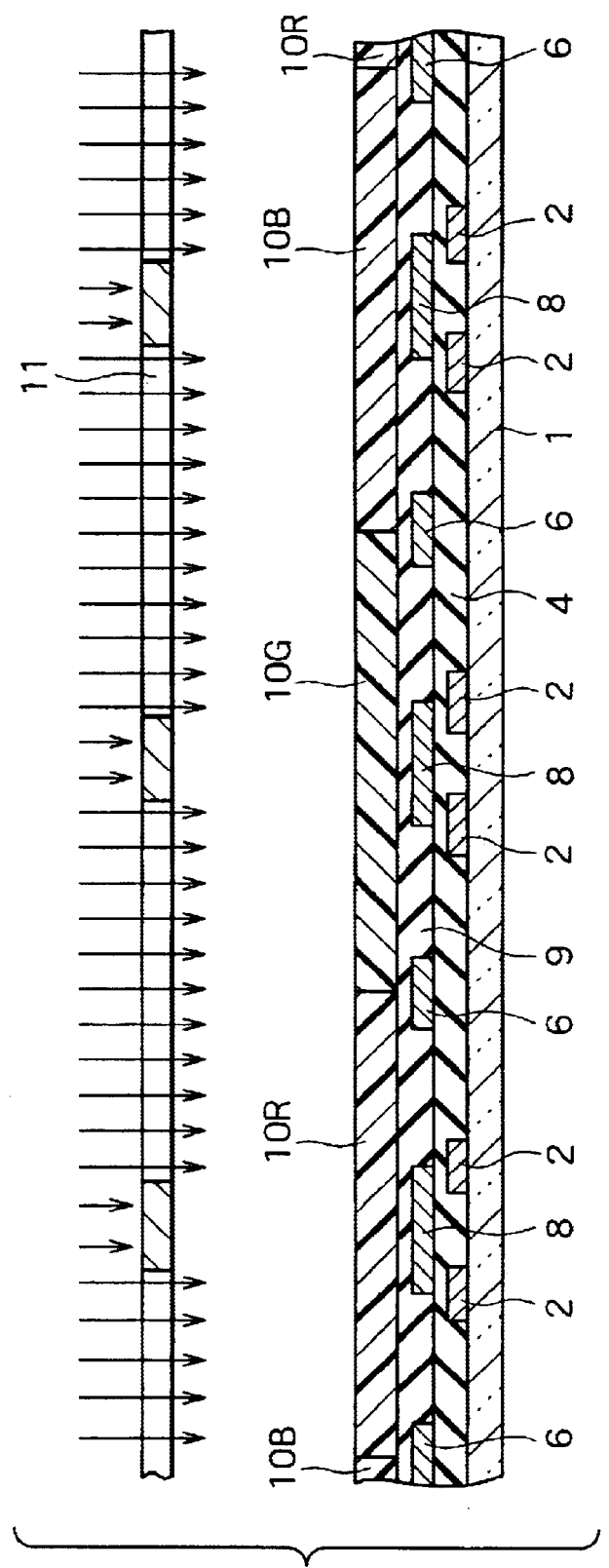
FIG. 13 is a cross-sectional view showing the fabricating step subsequent to the one shown in FIG. 12.

Then, as shown in FIG. 13, the color filters 10R, the color filters 10G and the color filters 10B are simultaneously exposed by use of a photomask 11 intercepting light for the regions where contact holes for connecting the transparent pixel electrodes and the source electrodes 8 at each pixel are to be formed.

Figure 14:
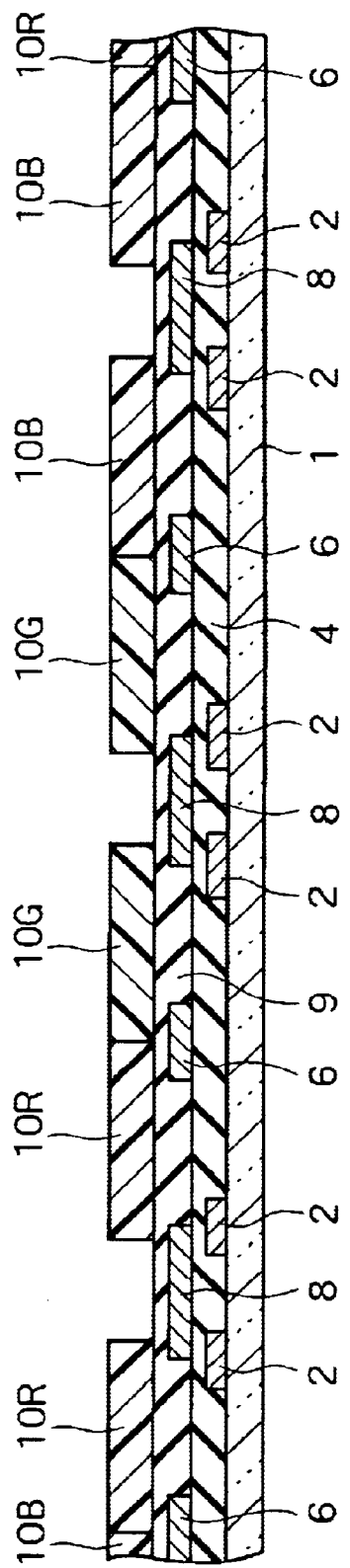
FIG. 14 is a cross-sectional view showing the fabricating step subsequent to the one shown in FIG. 13.

Then, the color filters 10R, the color filters 10G and the color filters 10B are simultaneously developed. At this time, as the developer, for example, a tetramethylammoniumhydroxide (TMAH) alkaline developer can be used. Since the color filters 10R, the color filters 10G and the color filters 10B comprise negative resist films, the light-intercepted regions, that is, the regions of each color filter corresponding to the regions connected to the transparent pixel electrodes after the source electrodes 8 are removed by the development as shown in FIG. 14, so that openings are formed.

Figure 15:
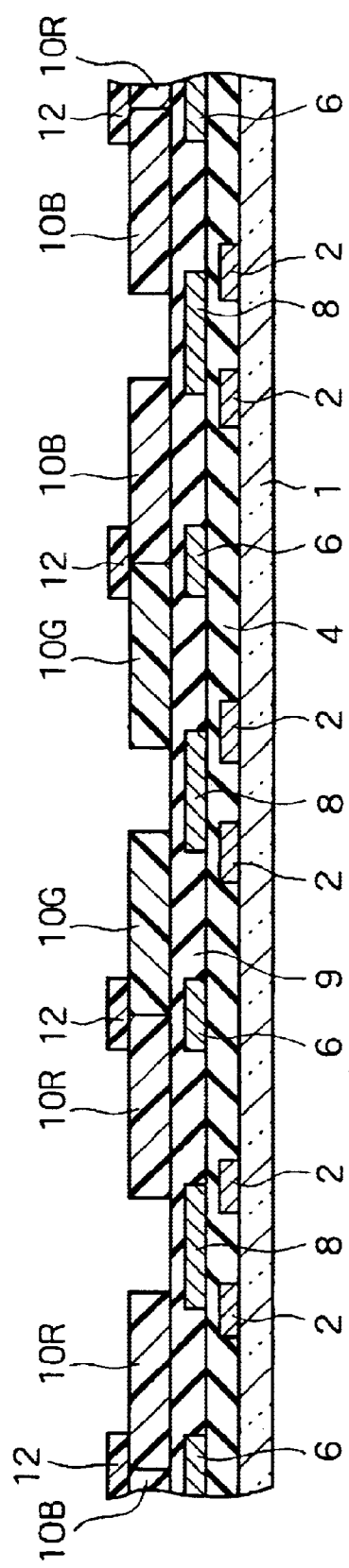
FIG. 15 is a cross-sectional view showing the fabricating step subsequent to the one shown in FIG. 14.

Then, as shown in FIG. 15, a black matrix 12 is formed in the linear regions of the TFTs and the scanning lines 2 extending in one direction without protruding into the pixels and in the regions corresponding to the data lines 6 on the color filters. That is, as shown in FIG. 20, red openings 12R, green openings 12G and blue openings 12B are provided in the black matrix 12. The black matrix 12 comprises, for example, a negative photosensitive acrylic resist film having a thickness of 1 to 3 μm in which a desired pigment or insulating carbon is dispersed.

Figure 16:
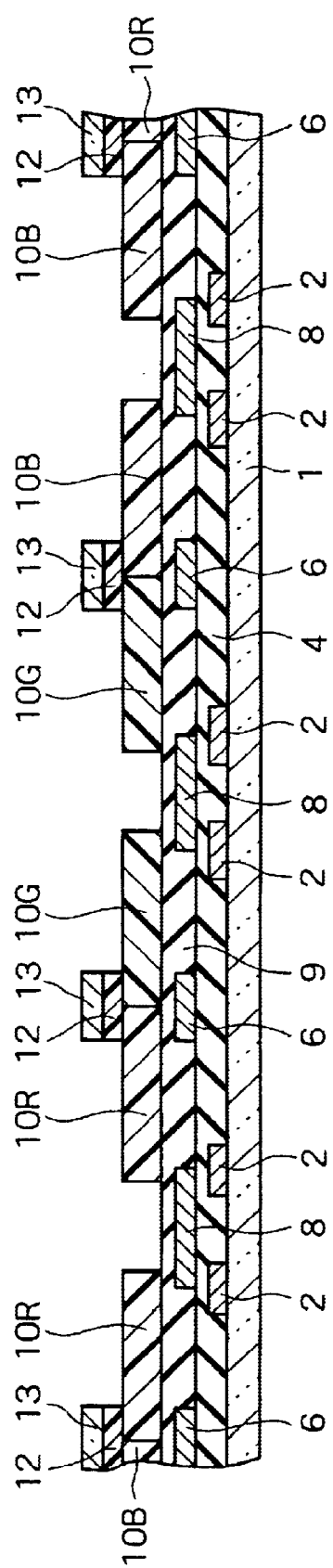
FIG. 16 is a cross-sectional view showing the fabricating step subsequent to the one shown in FIG. 15.

Then, as shown in FIG. 16, an overcoat layer 13 is formed on the black matrix 12 situated above the data lines 6.

Figure 17:
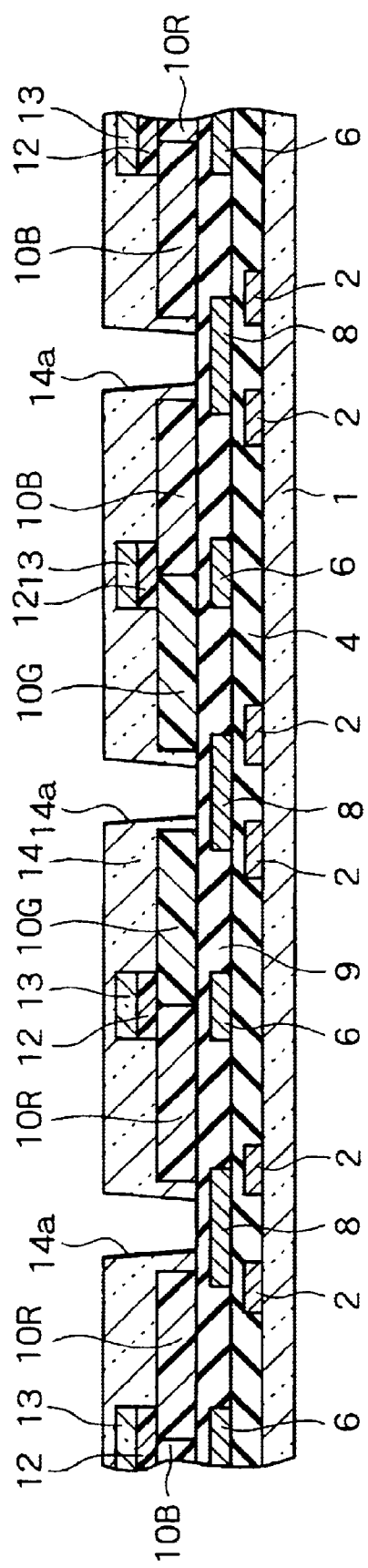
FIG. 17 is a cross-sectional view showing the fabricating step subsequent to the one shown in FIG. 16.

Further, as shown in FIG. 17, an overcoat layer 14 is formed in which openings 14a are provided in the openings of the color filters 10R, 10G and 10B. The overcoat layers 13 and 14 each comprise, for example, a positive photosensitive resist film having a thickness of 1.0 to 3.0 μm.

Figure 18:
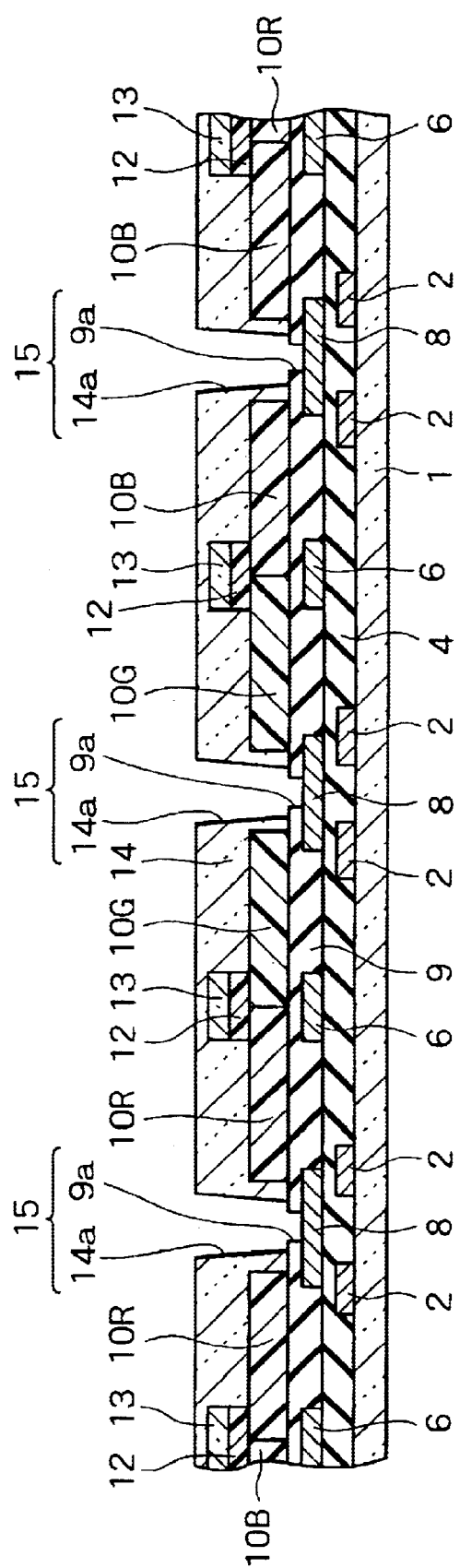
FIG. 18 is a cross-sectional view showing the fabricating step subsequent to the one shown in FIG. 17.
Figure 19:
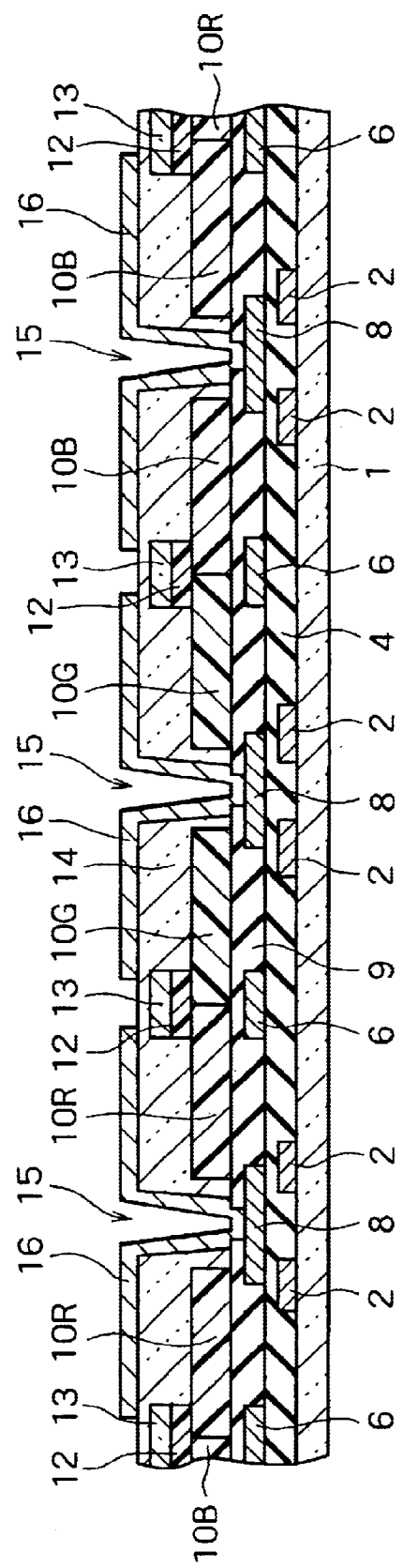
FIG. 19 is a cross-sectional view showing the fabricating step subsequent to the one shown in FIG. 18.

Then, as shown in FIG. 18, openings 9a are formed in the regions of the passivation film 9 exposed in the openings 14a. Contact holes 15 reaching the source electrodes 8 from the openings 9a and 14a are structured.

Then, transparent pixel electrodes 16 connected to the source electrodes 8 through the contact holes 15 pixel by pixel are formed on the overcoat layer 14. The transparent pixel electrodes 16 comprise, for example, an indium tin oxide (ITO) film having a thickness of 600 to 1200 Å.

Then, an alignment film 17 (see FIG. 24) is formed on the transparent pixel electrodes 16. The alignment film 17 contains, for example, a polyimide alignment agent, and has a thickness of, for example, 300 to 600 Å. In this manner, the CF on a TFT substrate is fabricated.

Figure 24:
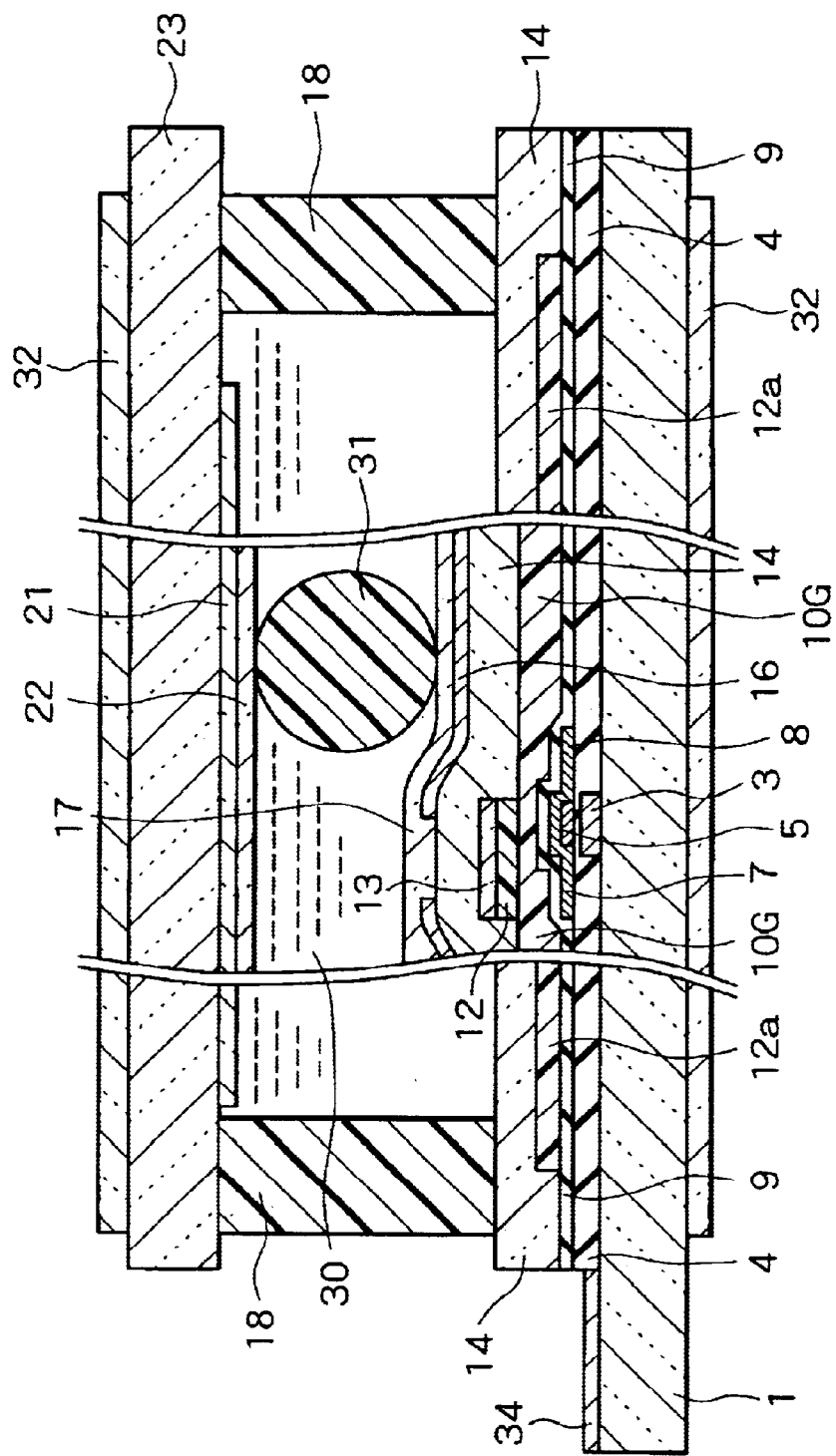
FIG. 24 is a cross-sectional view showing the liquid crystal display device fabricated by the embodiment of the present invention.
Figure 25:
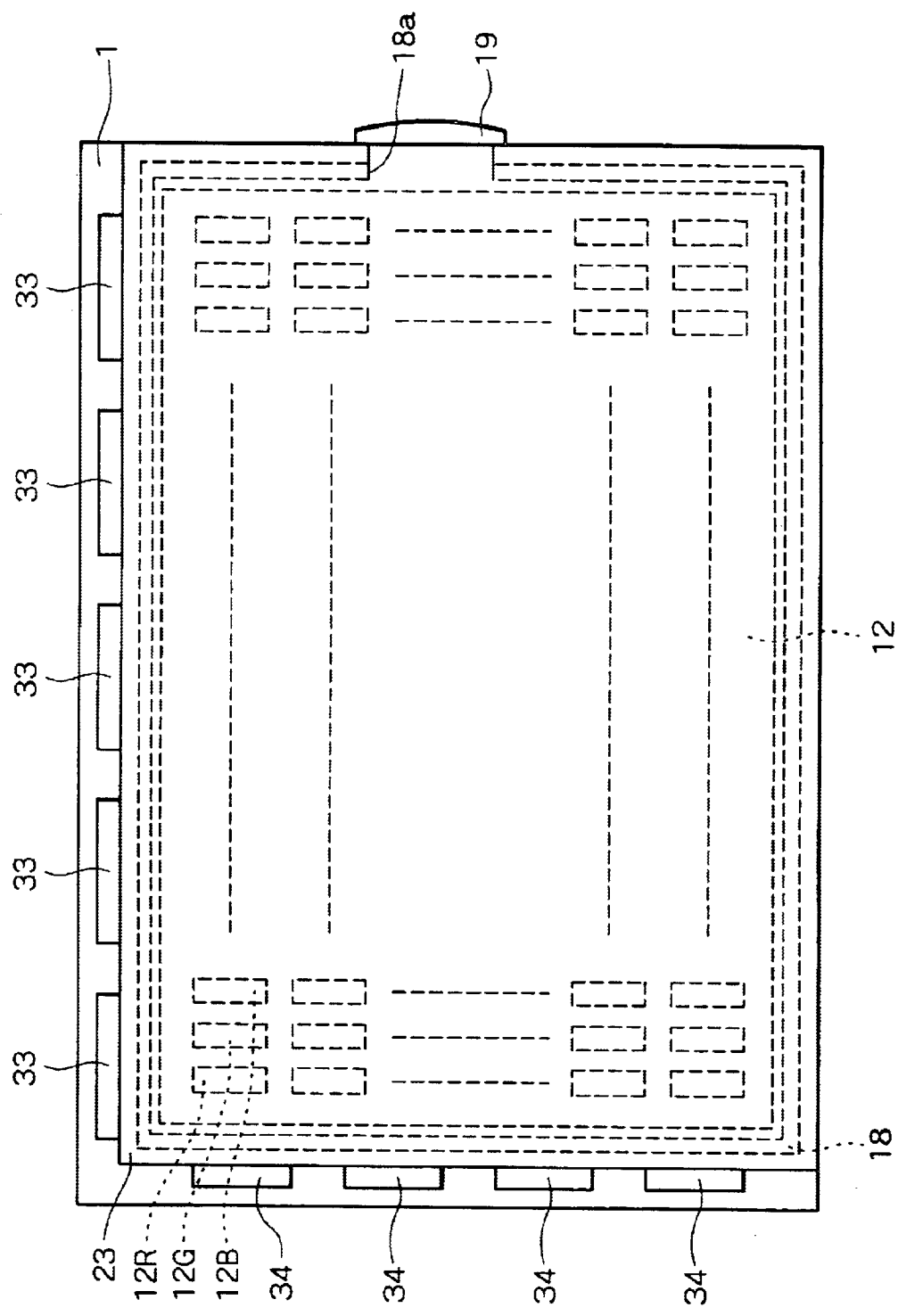
FIG. 25 is a plan view showing the liquid crystal display device fabricated by the embodiment of the present invention.

FIG. 24 and FIG. 25 are a cross-sectional view and a plan view, respectively, showing the liquid crystal display device fabricated by an embodiment of the present invention. In a case where the CF on a TFT substrate fabricated as described above is incorporated in a liquid crystal display panel, after the alignment film 17 is formed, a sealant 18 is formed on the overcoat layer 14 as shown in FIG. 24. The sealant 18 is made of, for example, an epoxy resin adhesive. Moreover, the sealant 18 has a hole 18a for pouring liquid crystal.

Then, a counter substrate comprising a transparent common electrode 21 and an alignment film 22 formed on one surface of a transparent substrate 23 is bonded by the sealant 18 so that the transparent common electrode 21 and the alignment film 22 are opposed to the alignment film 17. The transparent common electrode 21 is made of, for example, ITO, has a thickness of, for example, 800 to 1500 Å, and has a sheet resistance of, for example, 20 to 40 Ω/□. The alignment film 22 contains, for example, a polyimide alignment agent, and has a thickness of, for example, 300 to 600 Å. As the transparent substrate 23, for example, a glass substrate or a transparent resin substrate is used. The inside surface of the transparent substrate 23 may be treated with a silane surface treatment agent as the coupling treatment agent.

Then, liquid crystal is poured in through the hole 18a of the sealant 18 to thereby form a liquid crystal layer 30. In the liquid crystal layer 30, in-surface spacers 31 are dispersed, and in the sealant 18, peripheral spacers (not shown) are dispersed. The in-surface spacers (micropearls) 31 are made of, for example, a divinylbenzene cross-linked polymer having a diameter of 4.5 to 5.5 μm. The peripheral spacers (microrods) are made of, for example, a glass fiber having a diameter of 5 to 7 μm. The liquid crystal layer 30 contains, for example, a fluorine compound. After the liquid crystal is poured in, the hole 18a of the sealant 18 is sealed by a sealer 19. As the sealer 19, for example, an ultraviolet (UV) curing acrylate resin agent can be used.

Then, as shown in FIG. 24, a polarizing plate 32 is bonded onto the surfaces of the transparent substrates 1 and 23 opposite to the liquid crystal layer 30, and further, as shown in FIG. 25, an appropriate number of data line terminals 33 connected to the data lines 6 and an appropriate number of scanning line terminals 34 connected to the scanning lines 2 are attached. In this manner, the liquid crystal display panel is fabricated. Further, steps such as a step of connecting driving circuits such as a data driver and a scanning driver and a step of attaching an enclosure are performed to complete the liquid crystal display device.

According to this embodiment, since the color filters 10R, 10G and 110B of the three colors comprising a photosensitive resist film are simultaneously formed and openings are simultaneously formed therein, compared to the conventional fabricating method adopting spin coating in which the application of the material film to the entire surface of the transparent substrate and the formation of the openings are performed color by color, the number of fabricating steps can be significantly reduced to improve productivity. Moreover, according to the conventional fabricating method, since the color filters of each color are also applied to the pixels not requiring the color filters, it is necessary to remove many of the color filters thereafter. However, the regions removed in the present invention are only the regions corresponding to the openings. Therefore, the consumption amount of the material can be reduced to approximately one-third that of the conventional method. Further, although printing is adopted for the simultaneous formation of the color filters 10R, 10G and 10B, since the formation of the openings is performed as a separate step, necessary alignment precision can be sufficiently ensured.

Figure 26:
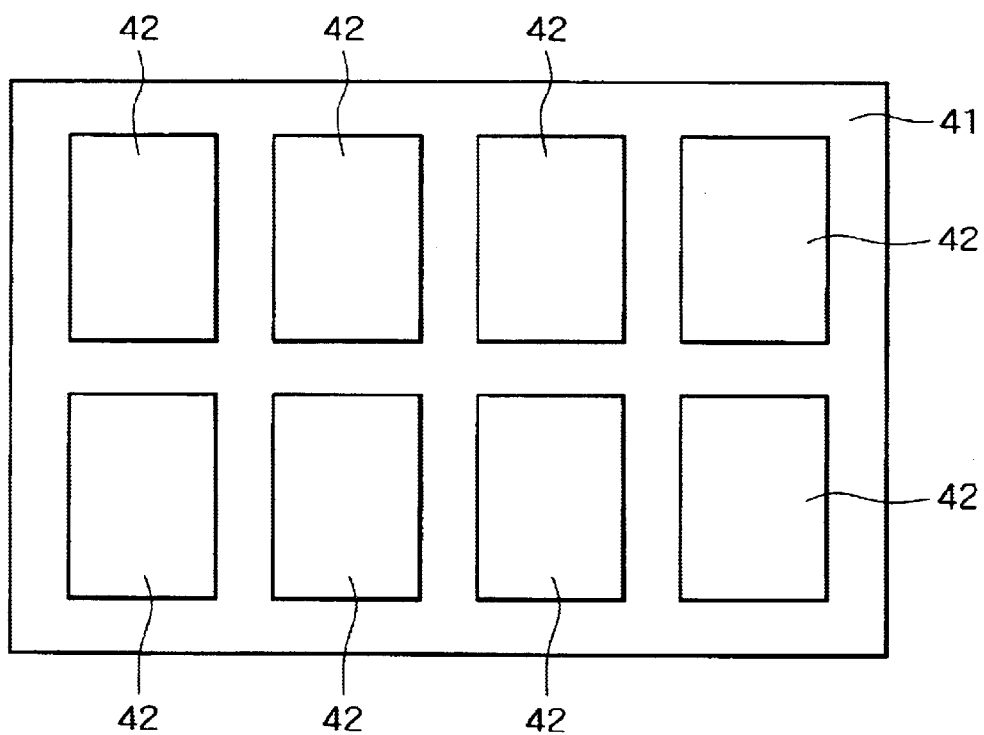
FIG. 26 is a schematic view showing a relationship between a transparent substrate and the CFs on TFT substrates.

By partitioning one transparent substrate, for example, into eight regions, simultaneously performing the fabricating steps as described above in each region and then, splitting the transparent substrate into eight parts, eight CFs on TFT substrates can be formed at the same time. FIG. 26 is a schematic view showing a relationship between a transparent substrate and the CFs on the TFT substrates. For example, from a rectangular transparent substrate 41 approximately 470 mm in length and approximately 370 mm in width, for example, eight 6.3-inch CFs on TFT substrates 42 can be obtained.

While in the above-described embodiment, the width of the regions of the black matrix overlapping the data lines when viewed as a plane is substantially the same as the width of the data lines in order that a high luminance is obtained, when a sufficient luminance is obtained, the width of the overlapping regions may be larger than that of the data lines. On the other hand, when a desired contrast is obtained, it is unnecessary to form the black matrix.

Moreover, in the present embodiment, as shown in FIG. 20 and so forth, the scanning lines 2 have not only a linear region but also a region protruding to the side opposite to the gate electrode 3 and overlapping the source electrode 8 with the gate insulating film 4 therebetween. The protruding region is provided for ensuring a larger capacitance between the source electrode 8 and the scanning line 2 and suppressing unnecessary variations in the potential of the source electrode 8 to thereby prevent image flickering. However, when images of sufficient quality are obtained, this region is not always necessary, and a structure may be adopted such that the contact holes 15 are disposed in the vicinity of the gate electrodes 3.

Further, while in the above-described embodiment, there is no region in which adjoining color filters overlap each other, a region may be present in which adjoining color filters slightly overlap each other.

As described above in detail, according to the present invention, since it is unnecessary to form the openings in the color filters color by color, the number of fabricating steps can be reduced to improve productivity. Moreover, in the step of forming the openings, the reduction in alignment precision occurring when printing is adopted can be avoided. Further, by printing the materials of the color filters, which are each colored in a predetermined color onto the transparent substrate, color filters of a plurality of colors can be easily formed, and by simultaneously forming color filters of a plurality of colors for all colors, it is unnecessary to apply the color filters color by color, so that the number of fabricating steps can be further reduced. In addition, by the color filters comprising a photosensitive resist film, photolithography can be adopted for the formation of the openings, so that the openings can be formed with high precision.

What is claimed is:

1. A method for fabricating a liquid crystal display device comprising the steps of:

forming a switching element for each pixel on a transparent substrate;

forming color filters of a plurality of colors on the transparent substrate so that the color filters cover the switching elements;

simultaneously forming an opening reaching a predetermined electrode of each of the switching elements, in each of the color filters for all colors; and forming, on each of the color filters, a pixel electrode connected to the predetermined electrode through the opening.

2. A method for fabricating a liquid crystal display device according to claim 1, wherein said forming of the color filters of the plurality of colors includes a step of printing materials of the color filters each colored in a predetermined color onto the transparent substrate.

3. A method for fabricating a liquid crystal display device according to claim 1, wherein in said forming of the color filters of the colors, the color filters for all colors are simultaneously formed.

4. A method for fabricating a liquid crystal display device according to claim 2, wherein in said forming of the color filters of the colors, the color filters for all colors are simultaneously formed.

5. A method for fabricating a liquid crystal display device according to claim 1, wherein said color filters comprise a photosensitive resist film.

6. A method for fabricating a liquid crystal display device according to claim 2, wherein said color filters comprise a photosensitive resist film.

7. A method for fabricating a liquid crystal display device according to claim 3, wherein said color filters comprise a photosensitive resist film.

8. A method for fabricating a liquid crystal display device according to claim 4, wherein said color filters comprise a photosensitive resist film.

9. A method for fabricating a liquid crystal display device according to claim 5, wherein said forming of the opening comprises the steps of: exposing the color filters of the plurality of colors by use of a photomask intercepting light for positions corresponding to the predetermined electrodes; and developing the color filters of the colors.

10. A method for fabricating a liquid crystal display device according to claim 6, wherein said forming of the opening comprises the steps of: exposing the color filters of the plurality of colors by use of a photomask intercepting light for positions corresponding to the predetermined electrodes; and developing the color filters of the colors.

11. A method for fabricating a liquid crystal display device according to claim 7, wherein said forming of the opening comprises the steps of: exposing the color filters of the plurality of colors by use of a photomask intercepting light for positions corresponding to the predetermined electrodes; and developing the color filters of the colors.

12. A method for fabricating a liquid crystal display device according to claim 8, wherein said forming of the opening comprises the steps of: exposing the color filters of the plurality of colors by use of a photomask intercepting light for positions corresponding to the predetermined electrodes; and developing the color filters of the colors.

13. A method for fabricating a liquid crystal display device in which switching elements and color filters of a plurality of colors are formed on the same transparent substrate, said method comprising the steps of:

simultaneously printing, onto the transparent substrate, the color filters for all colors consisting of a photosensitive resist film;

exposing the color filters of the plurality of colors by use of a photomask intercepting light for positions corresponding to predetermined electrodes of the switching elements; and developing the color filters of the colors.

* * * * *